(12) United States Patent
Yan et al.

(10) Patent No.: US 7,932,316 B2
(45) Date of Patent: Apr. 26, 2011

(54) PROCESSABLE RUBBER COMPOSITION

(75) Inventors: Yuan-Yong Yan, Copley, OH (US);
Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 5 days.

(21) Appl. No.: 11/958,052

(22) Filed: Dec. 17, 2007

(65) Prior Publication Data
US 2008/0161478 A1 Jul. 3, 2008

Related U.S. Application Data

(60) Provisional application No. 60/882,904, filed on Dec. 30, 2006.

(51) Int. Cl.
*C08L 9/00* (2006.01)
*C08K 3/04* (2006.01)

(52) U.S. Cl. ........ 524/500; 524/495; 524/492; 524/515; 524/525; 525/192; 525/332.1

(58) Field of Classification Search .................. 525/332, 525/333, 39, 332.1, 332.9, 332.5, 331.9, 525/342, 374, 375, 376, 271; 523/200; 524/426, 524/495, 571, 572; 526/332
See application file for complete search history.

(56) References Cited

U.S. PATENT DOCUMENTS

| | | | | |
|---|---|---|---|---|
| 3,972,878 | A | * | 8/1976 | Schirmann et al. ........... 549/415 |
| 4,906,687 | A | * | 3/1990 | Modic .............................. 525/57 |
| 6,642,291 | B2 | * | 11/2003 | Chino et al. .................. 524/196 |
| 2007/0037956 | A1 | | 2/2007 | Hogan et al. |
| 2007/0293622 | A1 | | 12/2007 | Yan |
| 2008/0275184 | A1 | * | 11/2008 | Karato et al. ................. 525/105 |

OTHER PUBLICATIONS

"Nitrofunctional Group from the World of Chemistry." Thomson Corporation. 2005.*
L.J. Prins et al., "Noncovalent Synthesis Using Hydrogen Bonding," *Angew. Chem. Int. Ed.*, 2001, vol. 40, pp. 2382-2426 (Wiley-VCH Verlag GmbH; Weinheim, Germany).
J. Rebek, JR., "Reversible Encapsulation and Its Consequences in Solution," *Acc. Chem. Res.*, 1999, vol. 32, No. 4, pp. 278-286 (American Chemical Society; Washington, DC).

* cited by examiner

*Primary Examiner* — Vasu Jagannathan
*Assistant Examiner* — Hannah Pak
(74) *Attorney, Agent, or Firm* — Meredith E. Hooker; Zollinger & Burleson

(57) ABSTRACT

A composition that includes functionalized polymers and one or more types of particulate filler exhibits both an increased gum Mooney viscosity and a decreased compound Mooney viscosity relative to a comparable composition that includes only one such functionalized polymer. The functionalized polymers include first and second types of functionalities which exhibit a non-covalent interaction that has a bond energy of from about 0.1 to about 20 kJ/mol.

20 Claims, No Drawings

PROCESSABLE RUBBER COMPOSITION

CROSS-REFERENCE TO RELATED APPLICATION

This application claims the benefit of provisional patent application No. 60/882,904 filed 30 Dec. 2006, the entirety of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a composition including a polymer that includes a first type of functional group, a polymer that includes a second type of functional group and one or more types of particulate filler; the first and second types of functional groups exhibit a non-covalent interaction that has a bond energy of from about 0.1 to about 20 kJ/mol. Relative to a comparable composition that includes only one such functionalized polymer, this composition exhibits both an increased gum Mooney viscosity and a decreased compound Mooney viscosity.

In another aspect is provided a composition that includes a polymer including a hydroxyl or amine group; a polymer including at least one of a nitro, urea, urethane, amide, and carboxylate group; and one or more types of particulate fillers. The composition exhibits both an increased Mooney viscosity and a decreased compound Mooney viscosity relative to a comparable composition that includes only one of said polymers.

In another, related aspect is provided a composition that includes one or more types of particulate fillers and a polymer including a terminal moiety which includes both an amine group and a nitro group.

In other aspects are provided the foregoing compositions that further include one or more organic solvents (liquids in which the polymer(s) is/are at least partially soluble) and/or particulate fillers, vulcanizates provided from such compositions, and methods for making such vulcanizates.

The polymers in the foregoing compositions preferably include polyene mer units. In certain embodiments, the polyenes can be conjugated dienes, and the resulting conjugated diene mer can incorporated substantially randomly along the polymer chain. The polymers alternatively or in addition can be substantially linear.

Regardless of particular characteristics, the functionalized polymers can interact with particulate filler such as, e.g., carbon black and silica.

Other aspects of the present invention will be apparent to the ordinarily skilled artisan from the detailed description that follows. To assist in understanding that description of various embodiments, certain definitions (which are intended to apply throughout unless the surrounding text explicitly indicates a contrary intention) are provided immediately below:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"lanthanide compound" means a compound that includes at least one atom of La, Nd, Ce, Pr, Pm, Sm, Eu, Gd, Tb, Dy, Ho, Er, Tm, Yb, Lu, and didymium (a mixture of rare-earth elements that can be obtained from monazite sand);

"organoaluminum compound" means a compound containing at least one Al-C bond;

"organomagnesium compound" means compound containing at least one Mg—C bond;

"radical" means the portion of a molecule that remains after reacting with another molecule, regardless of whether any atoms are gained or lost as a result of the reaction;

"drop temperature" is a prescribed upper temperature at which a filled rubber composition (vulcanizate) is evacuated from mixing equipment (e.g., a Banbury mixer) to a mill for being worked into sheets;

"Mooney viscosity" is an arbitrary 0-100 scale representation of the resistance to flow of an uncured or partially cured polymer, typically an elastomer, determined by measuring the amount of torque required to rotate an embedded cylindrical metal (optionally knurled) disk or rotor in a cylindrical (optionally serrated) cavity at a defined temperature, disc size, and time to reach equilibrium;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"cold-flow" is a deformation under stress which occurs after cessation of, as opposed to simultaneous with, the occurrence of the stressing or deforming event;

"non-covalent interaction" is a weak intermolecular force, typically on the order of ~0.1 to ~20 kJ/mol, between functional groups (or portions thereof) bonded to different polymer chains;

"terminus" means an end of a polymeric chain; and

"terminal moiety" means a group or functionality located at a terminus.

DETAILED DESCRIPTION

As apparent from the Summary section, the composition includes one or more polymers that contain a plurality (i.e., two or more) of functional groups. At least two of these functional groups exhibit a non-covalent interaction that has a relatively low bond energy, i.e., from about 0.1 to about 20 kJ/mol. Relative to a comparable composition that includes only one such functionalized polymer, such a composition exhibits both an increased gum Mooney viscosity and a decreased compound Mooney viscosity.

One or more of the polymers of the composition can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Depending on the intended end use, one or more of the polymer chains can include pendent aromatic groups, which can be provided, e.g., through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50%, from about 10 to about 45%, or from about 20 to about 35%, of the polymer chain; the microstructure of such interpolymers can be random, i.e., the mer units derived from each type of constituent monomer do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from about 10 to about 80%, optionally from about 25 to 65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total polyene content, is considered to be "substantially linear". For certain end use applications, however, keeping the content of 1,2-linkages even lower—e.g., to less than about 7%, less than 5%, less than 2%, or less than 1%—can be desirable.

The number average molecular weight ($M_n$) of the polymer typically is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75. Exemplary $M_n$ values range from ~5000 to ~200,000, commonly from ~25,000 to ~150,000, and typically from ~50,000 to ~125,000.

Such polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, living polymerizations are described first followed by a description of pseudo-living polymerizations. After these descriptions, the functionalization and processing of polymers so made are discussed.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithio-benzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithio-decane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching.

Certain end use applications call for polymers that have properties that can be difficult or inefficient to achieve via anionic or living polymerizations such as those just described. For example, in some applications, conjugated diene polymers having high cis-1,4-linkage contents can be desirable. Such polydienes can be prepared by processes using lanthanide-based catalysts (as opposed to the initiators employed in living polymerizations) and may display pseudo-living characteristics.

In certain embodiments, the catalyst composition can include a lanthanide compound, an alkylating agent, and a compound including a labile halogen atom. Where the lanthanide compound and/or alkylating agent include a labile halogen atom, the catalyst need not include a separate halogen source, i.e., the catalyst may simply include a halogenated lanthanide compound and an alkylating agent. In certain embodiments, the alkylating agent may include both an aluminoxane and an alkyl aluminum compound. In other embodiments, a non-coordinating anion or non-coordinating anion precursor may be employed in lieu of a halogen source. Where the alkylating agent includes a hydride compound, the halogen source may include a tin halide as disclosed in U.S. Pat. No. 7,008,899. In these or other embodiments, other organometallic compounds (e.g., a nickel-containing compound may as disclosed in U.S. Pat. No. 6,699,813) or Lewis bases also may be employed.

Various lanthanide compounds or mixtures thereof can be employed. These compounds may be soluble in hydrocarbon solvents such as those discussed previously with respect to living polymerizations. Hydrocarbon-insoluble lanthanide compounds, which can be suspended in the polymerization medium to form a catalytically active species, also can be used.

The lanthanide atom in the lanthanide compounds can be in various oxidation states, e.g., 0, +2, +3, and +4. Exemplary lanthanide compounds include lanthanide carboxylates, organophosphates, organophosphonates, organophosphinates, carbamates, dithiocarbamates, xanthates, β-diketonates, alkoxides or aryloxides, halides, pseudo-halides, and oxyhalides, as well as organolanthanide compounds. Exemplary lanthanide compounds include, but are not limited to neodymium carboxylates: neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate;

neodymium organophosphates: neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl)phosphate, and neodymium (2-ethylhexyl) (p-nonylphenyl)phosphate.

neodymium organophosphonates: neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octyl-phosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)-phosphonate, neodymium (2-ethylhexyl) butylphosphonate, neodymium (1-methyl-heptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate;

neodymium organophosphinates: various neodymium alkylphosphinates, neodymium phenylphosphinate, neodymium (p-nonylphenyl)phosphinate, neodymium dialkylphosphinates, neodymium diphenylphosphinate, neodymium bis(p-nonylphenyl)phosphinate, neodymium butyl(2-ethylhexyl)phosphinate, neodymium (1-methylheptyl)(2-ethylhexyl)phosphinate, and neodymium (2-ethylhexyl)(p-nonylphenyl)-phosphinate;

neodymium carbamates: neodymium dimethylcarbamate, neodymium diethyl-carbamate, neodymium diisopropylcarbamate, neodymium dibutylcarbamate, and neodymium dibenzylcarbamate;

neodymium dithiocarbamates: neodymium dimethyldithiocarbamate, neodymium diethyldithiocarbamate, neodymium diisopropyldithiocarbamate, neodymium di-butyldithiocarbamate, and neodymium dibenzyldithiocarbamate;

neodymium xanthates: neodymium methylxanthate, neodymium ethylxanthate, neodymium isopropylxanthate, etc., and neodymium benzylxanthate;

neodymium β-diketonates: neodymium acetylacetonate, neodymium trifluoro-acetylacetonate, neodymium hexafluoroacetylacetonate, neodymium benzoylacetonate, and neodymium 2,2,6,6-tetramethyl-3,5-heptanedionate;

neodymium alkoxides or aryloxides: neodymium methoxide, neodymium ethoxide, neodymium isopropoxide, neodymium 2-ethylhexoxide, neodymium phenoxide, neodymium nonylphenoxide, and neodymium naphthoxide; and neodymium halides: $NdF_3$, $NdCl_3$, $NdBr_3$, and $NdI_3$;

neodymium pseudo-halides: $Nd(CN)_3$, $Nd(OCN)_3$, neodymium thiocyanate, neodymium azide, and neodymium ferrocyanide; and neodymium oxyhalides: NdOF, NdOCl, and NdOBr.

(The foregoing list is limited to Nd compounds for the sake of simplicity, but this extensive list easily can be used by the ordinarily skilled artisan to identify and select similar compounds employing other lanthanide metals.)

Various alkylating agents, which also can be referred to as hydrocarbylating agents, or mixtures thereof can be used. Alkylating agents include organometallic compounds that can transfer hydrocarbyl groups to another metal. Typically, these agents include organometallic compounds of electropositive metals such as those from Groups 1, 2, and 3 (Groups IA, IIA, and IIIA). Common alkylating agents include organoaluminum and organomagnesium compounds, some of which are soluble in the types of hydrocarbon solvents described above. Where the alkylating agent includes a labile halogen atom, the alkylating agent may also serve as the halogen-containing compound.

Organoaluminum compounds include those represented by the formula $AlR_nX_{3-n}$ where each R independently is a monovalent organic group attached to the Al atom via a C atom; each X independently is a H atom, a halogen atom, a carboxylate group, an alkoxide group, or an aryloxide group; and n is an integer of from 1 to 3. Each R can be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, N, O, B, Si, S, and P.

Organoaluminum compounds include trihydrocarbylaluminum; dihydrocarbyl-aluminum hydrides, carboxylates, aryloxides, alkoxides, and halides; and hydrocarbyl-aluminum dihydride, bis(carboxylate), diaryloxide, dialkoxide, and dihalide compounds.

Trihydrocarbylaluminum compounds include trimethylaluminum, trimethyl-aluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2 ethylhexyl)aluminum, tricyclohexylaluminum, tris(1-methylcyclopentyl)aluminum, triphenylaluminum, tri-p-tolylaluminum, tris(2,6-dimethyl-phenyl) aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis-(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Also useful are aluminoxanes including oligomeric linear aluminoxanes and oligomeric cyclic aluminoxanes represented by the respective general formulae

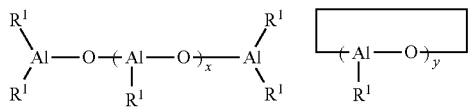

where x can be an integer of from 1 to about 100 or from about 10 to about 50; y may be an integer of from 2 to about 100 or from about 3 to about 20; and each R1 independently may be a monovalent organic group attached to the Al atom via a C atom. Each $R^1$ can be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, where each group may contain from 1 carbon atom, or the appropriate minimum number of carbon atoms to form the group, up to about 20 carbon atoms. These hydrocarbyl groups may contain heteroatoms such as those mentioned above. (The number of moles of the aluminoxane as used herein refers to the number of moles of the aluminum atoms rather than the number of moles of the oligomeric aluminoxane molecules.)

Aluminoxanes can be prepared by reacting trihydrocarbylaluminum compounds with water. This reaction can be performed by, e.g., (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Aluminoxane compounds include methylaluminoxane (MAO), modified methylaluminoxane (MMAO, which can be formed by substituting ~20-80% of the methyl groups of MAO with $C_2$-$C_{12}$ hydrocarbyl groups, preferably isobutyl groups), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, etc., and mixtures thereof. Isobutylaluminoxane is particularly useful due to its availability and solubility in aliphatic and cycloaliphatic hydrocarbon solvents.

One class of useful organomagnesium compounds can be represented by the formula $MgR_2$, where each R independently is a monovalent organic group attached to the Mg atom via a C atom. Each R can be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, where each group may contain from 1 carbon atom, or the appropriate minimum number of carbon atoms to form the group, up to about 20 carbon atoms. These hydrocarbyl groups may contain heteroatoms such as those set forth previously. Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium is particularly useful due to its availability and solubility in aliphatic and cycloaliphatic hydrocarbon solvents.

Another class of organomagnesium compounds that can be utilized include compounds represented by the formula $R^2MgX$ where $R^2$ is a monovalent organic group attached to the Mg atom via a C atom, and X is a hydrogen atom, a halogen atom, a carboxylate group, an alkoxide group, or an aryloxide group. In one or more embodiments, $R^2$ can be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, where each group may contain from 1 carbon atom, or the appropriate minimum number of carbon atoms to form the group, up to about 20 carbon atoms. These hydrocarbyl groups may contain heteroatoms such as those set forth previously. In one or more embodiments, X is a $C_1$-$C_{20}$ carboxylate, alkoxide, or aryloxide group. Organomagnesium compounds represented by the formula $R^2MgX$ include, but are not limited to, hydrocarbylmagnesium hydrides, halides, carboxylates, alkoxides, aryloxides, and mixtures thereof; various alkylmagnesium hydrides, halides, carboxylates, alkoxides, aryloxides, and mixtures thereof; and various arylmagnesium hydrides, halides, carboxylates, alkoxides, aryloxides, and mixtures thereof.

Various compounds, or mixtures thereof, that contain one or more labile halogen atoms can be employed as the halogen source. These compounds may simply be referred to as halogen-containing compounds. A combination of two or more halogen atoms can also be utilized. In one or more embodiments, the halogen-containing compounds may be soluble in a hydrocarbon solvent. In other embodiments, hydrocarbon-insoluble halogen-containing compounds, which can be suspended in the oligomerization medium to form the catalytically active species, may be useful. (Where neodymium halides, oxyhalides, or other compounds containing labile halogen atoms are employed, the Nd-containing compound can serve as both the lanthanide compound as well as the halogen-containing compound; a Lewis base such as THF may be employed as an aid for solubilizing this class of neodymium compounds in inert organic solvents.)

Types of halogen-containing compounds include, but are not limited to, elemental halogens, mixed halogens (e.g., ICl, IBr, $ICl_5$, and $IF_5$), hydrogen halides (e.g., HF, HCl, HBr, etc.), organic halides, inorganic halides, metallic halides, organometallic halides, and mixtures thereof.

Organic halides include t-butyl chloride, t-butyl bromides, allyl chloride, allyl bromide, benzyl chloride, benzyl bromide, chloro-di-phenylmethane, bromo-di-phenyl-methane, triphenylmethyl chloride, triphenylmethyl bromide, benzylidene chloride, benzylidene bromide, methyltrichlorosilane, phenyltrichlorosilane, dimethyldichlorosilane, diphenyl-dichlorosilane, trimethylchlorosilane, benzoyl chloride, benzoyl bromide, propionyl chloride, propionyl bromide, methyl chloroformate, and methyl bromoformate.

Inorganic halides include $PCl_3$, $PBr_3$, $PCl_5$, $POCl_3$, $POBr_3$, $BF_3$, $BCl_3$, $BBr_3$, $SiF_4$, $SiCl_4$, $SiBr_4$, $SiI_4$, $AsCl_3$, $AsBr_3$, $AsI_3$, $SeCl_4$, $SeBr_4$, $TeCl_4$, $TeBr_4$, $TeI_4$.

Metallic halides include $SnCl_4$, $SnBr_4$, $AlCl_3$, $AlBr_3$, $SbCl_3$, $SbCl_5$, $SbBr_3$, $AlI_3$, $AlF_3$, $GaCl_3$, $GaBr_3$, $GaI_3$, $GaF_3$, $InCl_3$, $InBr_3$, $InI_3$, $InF_3$, $TiCl_4$, $TiBr_4$, $TiI_4$, $ZnCl_2$, $ZnBr_2$, $ZnI_2$, and $ZnF_2$.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Non-coordinating anions include bulky anions that do not form coordinate bonds with, for example, the active center of a catalyst system, due to steric hindrance. Non-coordinating anions include tetraarylborate anions (which optionally can be fluorinated). Ionic compounds containing non-coordinating anions are known in the art, and also include a countercation such as a carbonium (e.g., triarylcarbonium), ammonium, or phosphonium cation. An exemplary material is tetrakis(pentafluorophenyl)borate.

Non-coordinating anion precursors include substances that can form a non-coordinating anion under reaction conditions. Non-coordinating anion precursors include trialkyl boron compounds, $BR'_3$, where R' is a strong electron-withdrawing group such as pentafluorophenyl group.

The foregoing catalyst compositions may have high catalytic activity for polymerizing conjugated dienes into stereospecific polydienes over a wide range of catalyst concentrations and catalyst ingredient ratios. The catalyst ingredients may interact to form an active catalyst species, and the optimum concentration for any one ingredient may depend on the concentrations of the other ingredients.

The molar ratio of alkylating agent to lanthanide compound (alkylating agent/Ln) can range from about 1:1 to about 1000:1, from about 2:1 to about 500:1, or from about 5:1 to about 200:1. Where both an alkyl aluminum compound and an aluminoxane are employed as alkylating agents, the molar ratio of alkyl aluminum to lanthanide compound (Al/Ln) can range from about 1:1 to about 200:1, from about 2:1 to about 150:1, or from about 5:1 to about 100:1, and the molar ratio of the aluminoxane to the lanthanide compound (aluminoxane/Ln) can range from 5:1 to about 1000:1, from about 10:1 to about 700:1, or from about 20:1 to about 500:1. The molar ratio of the halogen-containing compound to the lanthanide compound (halogen atom/Ln) can range from about 1:2 to about 20:1, from about 1:1 to about 10:1, or from about 2:1 to about 6:1.

The molar ratio of non-coordinating anion or non-coordinating anion precursor to lanthanide compound (An/Ln) can range from about 1:2 to about 20:1, from about 3:4 to about 10:1, or from about 1:1 to about 6:1.

The catalyst composition may be formed by combining the catalyst ingredients. Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by various methods. For example, the catalyst composition may be formed in situ by adding the catalyst ingredients to a solution containing monomer and solvent, or simply bulk monomer, in either a stepwise or simultaneous manner. In one embodiment, the alkylating agent can be added first, followed by the lanthanide compound, and then followed by the halogen-containing compound, if used, or by the non-coordinating anion or non-coordinating anion precursor.

Alternatively, the catalyst ingredients may be mixed outside the polymerization system at a temperature of from ~−20° to ~80° C., and the resulting catalyst composition aged for a few minutes to a few days prior to being added to the monomer solution.

The catalyst composition also may be formed in the presence of at least one conjugated diene monomer. That is, the catalyst ingredients may be pre-mixed in the presence of a small amount of conjugated diene monomer at a temperature of from ~−20° to ~80° C. The amount of conjugated diene monomer that may be used can range from about 1 to about 500 moles, from about 5 to about 250 moles, or from about 10 to about 100 moles, per mole of the lanthanide compound. The resulting catalyst composition can be aged for a few minutes to a few days prior to being added to the remainder of the conjugated diene monomer.

Alternatively, the catalyst composition may be formed by using a multistage procedure. The first stage can involve combining the alkylating agent with the lanthanide compound in the absence of conjugated diene monomer or in the presence of a small amount of conjugated diene monomer at a temperature of from ~−20° to ~80° C. The foregoing reaction mixture and the halogen-containing compound, non-coordinating anion, or non-coordinating anion precursor can be charged in either a stepwise or simultaneous manner to the remainder of the conjugated diene monomer.

When a solution of the catalyst composition or one or more of the catalyst ingredients is prepared outside the polymerization system, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include those described previously.

Production of polymer can be accomplished by polymerizing conjugated diene(s) in the presence of a catalytically effective amount of the foregoing catalyst composition. The total catalyst concentration to be employed in the polymerization mass may depend on the interplay of various factors such as the purity of the ingredients, polymerization temperature, polymerization rate and conversion desired, desired molecular weight, and the like. Accordingly, a specific total catalyst concentration cannot be definitively set forth except to say that catalytically effective amounts of the respective catalyst ingredients can be used. The amount of the lanthanide compound used can be varied from about 0.01 to about 2 mmol, from about 0.02 to about 1 mmol, or from about 0.05 to about 0.5 mmol, per 100 g of conjugated diene monomer.

Polymerization can be carried out in an organic solvent as the diluent. Both the monomer to be polymerized and the polymer formed are soluble in the polymerization medium. Alternatively, a precipitation polymerization system may be employed by choosing a solvent in which the polymer formed is insoluble. In both cases, the monomer to be polymerized may be in a condensed phase. Also, the catalyst ingredients may be solubilized or suspended within the organic solvent; here and in other embodiments, the catalyst ingredients or components are unsupported or not impregnated into a catalyst support. In other embodiments, the catalyst ingredients or components may be supported.

In performing these polymerizations, an amount of organic solvent in addition to the amount of organic solvent that may be used in preparing the catalyst composition may be added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can range from about 3 to about 80% by weight, from about 5 to about 50% by weight, or from about 10 to about 30% by weight.

Polymerization of conjugated dienes may also be carried out by means of bulk polymerization, which refers to a polymerization environment where substantially no solvents are employed, either in a condensed liquid phase or in a gas phase. Polymerization of conjugated dienes also may be carried out as a batch process, a continuous process, or a semi continuous process.

Polymers prepared by employing a lanthanide-based catalyst composition may include reactive chain ends prior to terminating or quenching the polymerization.

Regardless of which type of polymerization process is employed, at this point, the reaction mixture commonly is referred to as a "polymer cement" because of its relatively high concentration of polymer. Prior to quenching, the polymer can be provided with any of a variety of functional groups. This functionalization can be effected by introducing to the polymer cement one or more compounds that include appropriate functionalities.

The composition of the present invention includes polymers that include first and second types of functionalities which exhibit a non-covalent interaction having a bond energy of from about 0.1, or about 0.4, to about 20 kJ/mol. Such functionalities can be provided in a single functional group (described in more detail below) or through different functional groups directly bonded to two or more polymers.

While the processing description provided below does not discuss storage and handling, these characteristics are important when considering whether a particular functionalized polymer and/or composition in which such functionalized polymer is utilized can be processed in a commercially useful manner. For example, prior to processing, stored synthetic rubber (regardless of form such as, e.g., slab, wigwag, etc.) preferably resists flow, i.e., exhibits good cold-flow resistance. However, when blended or milled with other ingredients during compounding (as discussed in detail below) at elevated temperatures, resistance to flow no longer necessarily is desirable, i.e., an excessive resistance to flow can compromise or hinder processability.

While cold-flow resistance can be difficult to define quantitatively, a useful approximation is Mooney viscosity at a sub-processing temperature, i.e., a temperature of from about 30° to about 75° C., e.g., ~50° C., or even at a temperature near the low end of typical processing conditions, i.e., from about 80° to about 110° C., e.g., ~100° C.

Compound Mooney viscosity typically is measured at or near the temperatures employed in the early stages of compounding, i.e., blending of polymer(s) with additives and fillers such as carbon black, silica, etc. As discussed in detail below, these temperatures often are in the range of ~115° to ~140° C., e.g., ~130° C.

A composition according to the present invention can exhibit both an increase in gum (pre-compounding) Mooney viscosity and a decrease in compound Mooney viscosity, both of which are desirable. Without being bound by theory, the different types of functionalities employed might interact non-covalently, i.e., exhibit bond energies of from about 0.1, or about 0.4, to about 20 kJ/mol. The relatively small bond energies involved are sufficient to impede flow (i.e., increase cold-flow resistance) at lower temperatures such as those encountered during storage but still are low enough to be overcome or broken when thermal and kinetic energy are added during compounding and processing. Examples of non-covalent interactions that can provide bond energies of the desired level include, but are not limited to hydrogen bonding, hydrophobic interactions, ionic interactions, and dispersion (van der Waals) forces. For additional information on such intermolecular forces, the interested reader is directed to any of a variety of basic chemistry texts such as, e.g., W. L. Masterton et al., *Chemical Principles*, 5th ed., (W.B. Saunders Co., New York, 1981), pp. 252-56; a more extensive treatment can be found at, e.g., P. Timmerman et al., "Noncovalent synthesis using hydrogen bonding," *Angew. Chem. Int. Ed.*, 40, pp. 2382-2426 (2001).

The ordinarily skilled artisan is familiar with the types of compounds commonly employed to react with polymers, either living or pseudo-living, so as to provide terminal functional groups. Similarly, when presented with lists of such materials, the same ordinarily skilled artisan can match those groups or functionalities which, when present in the same composition, can provide the type of non-covalent interactions just described. By way of non-limiting example can be mentioned hydrogen bonding between polymers containing polar X—H bonds and nonbonding electron pairs on atom Z with both of X and Z having electronegativities greater than that of H, in other words, X and Z can be C, N, O, F, P, S, Cl, Se, Br, and I. The strongest hydrogen bonding typically occurs when both X and Z are one of N, O, and F. In general, the —XH group (e.g., hydroxyl and non-tertiary amine groups) is referred to as the "proton donor" and the Z atom is called the "proton acceptor" (examples of which can be found in groups such as —CO—, —C(O)O—, —C(O)NR$_2$, —OC(O)NH—, —NHC(O)NH—, —NO$_2$, etc.).

For example, polymers with terminal moieties that contain hydroxyl and/or non-tertiary amine functional groups can exhibit significantly enhanced interactivity with certain particulate fillers, particularly carbon black, albeit often at a cost of reduced processability, e.g., reduced resistance to cold-flow and longer mixing times. However, if the same or other polymer chains can be functionalized with functional groups with which the hydroxyl and/or amine groups can interact non-covalently, e.g., —NO$_2$, urea, urethane, carboxylate, and amide groups, processability can be enhanced without significantly increasing hysteresis. Examples of compounds which, when reacted with carbanionic polymers, can result in radicals that contain hydroxyl and/or amine functional groups include, but certainly are not limited to, lactams such as imidazolidinones (e.g., 1,3-dimethyl-2-imidazolidinone (DMI)) and pyrrolidinones (e.g., 1-methyl-2-pyrrolidinone (NMP)), oximes, hydrazones, azines and other functional imines. Examples of compounds which, when reacted with carbanionic polymers, can result in radicals that contain —NO$_2$ groups include, but certainly are not limited, the various nitrobenzaldehyde piperidinehydrazones. Other compounds that can be reacted with carbanionic polymers to yield radicals that contain groups with proton acceptor atoms include various isocyanates, diisocyanates and anhydrides.

Quenching can be conducted by stirring the polymer and an active hydrogen-containing compound, such as an alcohol or acid, for up to about 120 minutes at temperatures of from about 250 to about 150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate interpolymer (EVA), epichlorohydrin rubbers, chlorinated polyethylene rubbers, chlorosulfonated polyethylene rubbers, hydrogenated nitrite rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of about 1 to about 100 parts by weight (pbw) per 100 parts of polymer (phr), preferably in an amount from about 5 to about 80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-J, in which A represents a functional group capable of bonding physically and/or chemically with a group on the surface of the silica filler (e.g., surface silanol groups); T represents a hydrocarbon group linkage; and J represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the J and A functionalities mentioned above. An exemplary coupling agent is bis[3-(triethoxysilyl)-propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, typically up to about 20 phr.

Other conventional rubber additives also can be added. These include, for example, process oils, plasticizers, antidegradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

All patents and published patent applications mentioned previously are incorporated herein by reference.

The following non-limiting, illustrative examples provide the reader with detailed conditions and materials that can be useful in the practice of the present invention. All values given in the form of percentages hereinthroughout are weight percentages unless the surrounding text explicitly indicates a contrary intention.

EXAMPLES

In the examples, dried glass vessels previously sealed with extracted septum liners and perforated crown caps under a positive $N_2$ purge were used for all preparations. Butadiene (21.5% in hexane for examples 4-6 and 10-12, 21.1% for examples 7-9 and 14, 22.5% for example 13, and 21.7% for examples 15-17), styrene (33% in hexane), hexane, n-butyllithium (1.60 M in hexane), 2,2-bis(2'-tetrahydrofuryl)propane solution (1.6 M in hexane, stored over $CaH_2$), and butylated hydroxytoluene (BHT) solution (in hexane for examples 4-14 and in isopropanol for examples 15-17) were used.

Commercially available reagents and starting materials included the following, all of which were acquired from Sigma-Aldrich Co. (St. Louis, Mo.) and used without further purification unless otherwise noted in a specific example: 4-nitrobenzaldehyde (98% purity), 3-nitrobenzaldehyde (99% purity), 2-nitrobenzaldehyde (98% purity), NMP (99% purity), DMI (99% purity), diisobutylaluminum hydride, diethylaluminum chloride, 4,4'-bis-(diethylamino)benzophenone (DEAB, 99% purity), and 3,3,4-trimethyl-1,6-diisocyanatohexane (TMDICH, 99% purity). Neodymium versatate was acquired from Rhodia (Freeport, Tex.).

Examples 1-3

Nitro Group-Containing Hydrazones

In a $N_2$ atmosphere, 12.4 g (82 mmol) 4-nitrobenzaldehyde and 9.7 mL (90 mmol) 1-aminopiperidine in 80 mL $CH_2Cl_2$ and 10 mL triethylamine were stirred overnight. When reaction was complete (as indicated by thin layer chromatography), solvent was removed by rotary evaporation. The residue was purified by silica gel column chromatography (eluted with a 6:94 blend of ethyl acetate and hexane); a total of 17.9 g 4-nitrobenzaldehyde piperidinehydrazone (94% yield) was recovered.

This procedure was repeated with 3- and 2-nitrobenzaldehyde, resulting in recovery of the respective piperidinehydrazone products at 97% and 98% yields.

Structures of each of the 2-, 3-, and 4-nitrobenzaldehyde piperidinehydrazone materials were confirmed by $^1H$ NMR spectroscopy.

Example 4-6

Control and Comparative Anionically Initiated Polymers

To a $N_2$-purged reactor equipped with a stirrer was added 1.54 kg hexane, 0.41 kg styrene solution, and 2.53 kg butadiene solution. The reactor was charged with 3.53 mL n-butyllithium, followed by 1.10 mL 2,2-bis(2'-tetrahydrofuryl)propane solution. The reactor jacket was heated to 50° C. and, after ~40 minutes, the batch temperature peaked at ~60° C. After an additional ~30 minutes, polymer cement was transferred from the reactor to dried glass vessels.

A control (sample 4) was set aside while two others were terminated (50° C. bath for ~30 minutes) with, respectively, 3×0.46 mL NMP (sample 5) and 3×0.46 mL DMI (sample 6), both 1.0 M in toluene. Each of these was coagulated in isopropanol containing BHT and drum dried.

Examples 7-9

Compositions Containing Nitrohydrazone-Functionalized Polymers

To a $N_2$-purged reactor equipped with a stirrer was added 1.49 kg hexane, 0.41 kg styrene solution, and 2.58 kg butadiene solution. The reactor was charged with 3.27 mL n-butyllithium, followed by 1.10 mL 2,2-bis(2'-tetrahydrofuryl)propane solution. The reactor jacket was heated to 50° C. and, after ~40 minutes, the batch temperature peaked at ~60° C. After an additional ~30 minutes, polymer cement was transferred from the reactor to dried glass vessels.

The polymer cements were terminated (50° C. bath for ~30 minutes) with, respectively, 3×0.46 mL of 4-nitrobenzaldehyde piperidinehydrazone (1.0 M in toluene, sample 7), 3×0.46 mL of 3-nitrobenzaldehyde piperidinehydrazone (1.0 M in toluene, sample 8), and 3×0.46 mL of 2-nitrobenzaldehyde piperidinehydrazone (1.0 M in toluene, sample 9). Each of these was coagulated in isopropanol containing BHT and drum dried.

Examples 10-12

Compositions Containing Nitrohydrazone- and NMP-Functionalized Polymers

To a $N_2$-purged reactor equipped with a stirrer was added 1.54 kg hexane, 0.41 kg styrene solution, and 2.53 kg butadiene solution. The reactor was charged with 3.59 mL n-butyllithium, followed by 1.10 mL 2,2-bis(2'-tetrahydrofuryl)propane solution. The reactor jacket was heated to 50° C. and, after ~40 minutes, the batch temperature peaked at ~60° C. After an additional ~30 min., 1.14 mL 4-nitrobenzaldehyde piperidinehydrazone (from Example 1, 1.0 M in toluene) in 5 mL toluene was added to the reactor, followed by 4.59 mL NMP (1.0 M in toluene) in 10 mL toluene. After an additional ~30 minutes at 50° C., the polymer cement was coagulated in isopropanol containing BHT and drum dried. This is designated as sample 10.

Similar polymerizations and functionalizations were conducted with 3-nitrobenzaldehyde piperidinehydrazone/NMP (sample 11) and of 2-nitrobenzaldehyde piperidinehydrazone/NMP (sample 12).

Example 13

Composition Containing Hydrazone- and Nitrohydrazone-Functionalized Polymers

Cyclohexanecarboxaldehyde piperidinehydrazone was prepared through a condensation reaction in pyridine involving equimolar amounts of cyclohexanecarboxaldehyde (7.4 mL) and 1-aminopiperidine (6.5 mL) in pyridine (50 mL) were stirred for ~12 hours at room temperature. Pyridine was removed under vacuum distillation, and the residue was purified by silica gel column chromatography eluted with 10:90 mixture of diethyl ether and hexane to yield 11.6 g (98%) of a colorless oil, which was confirmed to be cyclohexanecarboxaldehyde piperidinehydrazone by $^1$H NMR spectroscopy. The product was dissolved in hexane to provide a 1.0 M solution.

To a $N_2$-purged reactor equipped with a stirrer was added 1.65 kg hexane, 0.41 kg styrene solution, and 2.42 kg butadiene solution. The reactor was charged with 3.63 mL n-butyllithium, followed by 1.10 mL 2,2-bis(2'-tetrahydrofuryl) propane solution. The reactor jacket was heated to 50° C. and, after ~40 minutes, the batch temperature peaked at ~60° C. After an additional ~30 minutes, 4.3 mL of the 1.0 M solution described in the preceding paragraph in 10 mL hexane was added to the reactor, followed by 1.16 mL 3-nitrobenzaldehyde piperidinehydrazone (1.0 M in toluene) in 5 mL toluene. After an additional ~30 minutes at 50° C., the polymer cement was coagulated in isopropanol containing BHT and drum dried.

Example 14

Composition Containing Nitrohydrazone- and DMI-Functionalized Polymers

To a $N_2$-purged reactor equipped with a stirrer was added 1.49 kg hexane, 0.41 kg styrene solution, and 2.58 kg butadiene solution. The reactor was charged with 3.27 mL n-butyllithium, followed by 1.10 mL 2,2-bis(2'-tetrahydrofuryl) propane solution. The reactor jacket was heated to 50° C. and, after ~40 minutes, the batch temperature peaked at 59.2° C. After an additional ~30 minutes, 1.25 mL 3-nitrobenzaldehyde piperidinehydrazone (1.0 M in toluene) in 5 mL toluene was added to the reactor, followed by 4.00 mL DMI (1.0 M in toluene). After an additional ~30 minutes at 50° C., the polymer cement was coagulated in isopropanol containing BHT and drum dried.

The cold flow resistance properties of the polymers from Examples 4-14 were measured by an Alpha Technologies™ RPA-2000 dynamic mechanical rheology testing unit (Alpha Technologies US LP; Akron, Ohio). The data from this test, conducted at 50° C., are presented below in Table 1.

TABLE 1

| | Stress relaxation at 100% strain (kg · cm) | | | | |
|---|---|---|---|---|---|
| | 5 sec. | 10 sec. | 20 sec. | 50 sec. | 100 sec. |
| Ex. 4 | 0.83 | 0.41 | 0.28 | 0.27 | 0.33 |
| Ex. 5 | 0.91 | 0.46 | 0.29 | 0.29 | 0.35 |

TABLE 1-continued

| | Stress relaxation at 100% strain (kg · cm) | | | | |
|---|---|---|---|---|---|
| | 5 sec. | 10 sec. | 20 sec. | 50 sec. | 100 sec. |
| Ex. 6 | 1.38 | 0.35 | 0.33 | 0.32 | 0.31 |
| Ex. 7 | 15.00 | 8.68 | 3.74 | 0.99 | 0.63 |
| Ex. 8 | 14.55 | 8.68 | 4.03 | 1.28 | 0.85 |
| Ex. 9 | 13.36 | 8.18 | 4.14 | 1.28 | 0.77 |
| Ex. 10 | 10.24 | 5.82 | 2.73 | 1.03 | 0.79 |
| Ex. 11 | 10.59 | 6.38 | 3.33 | 1.28 | 0.92 |
| Ex. 12 | 9.24 | 5.31 | 2.75 | 0.85 | 0.60 |
| Ex. 13 | 6.10 | 3.37 | 1.65 | 0.64 | 0.56 |
| Ex. 14 | 12.80 | 7.97 | 4.14 | 1.55 | 0.95 |

The data of Table 1 indicate that the polymers from Examples 7-14 exhibit significantly higher resistance to flow than the control non-functionalized styrene/butadiene interpolymer (Example 4) and comparative functionalized interpolymers (Examples 5-6).

Additionally, while the initial (i.e., at 5 seconds) cold flow resistance values of Examples 7-14 range from ~700% to ~1800% greater than that of the control (Example 4), the values at 100 seconds range only from ~170% to ~290% greater. Thus, inputting energy into systems containing the polymers from Examples 7-14 can overcome this very high resistance to cold flow. This can be seen as an indication that, while such materials can be stored in standard forms, such as bales or blocks, without significant undesirable flow, they also can be processed similarly to materials presently in commercial use.

Additionally, the data of Table 1 provide an indication that the same molecule can provide the groups that participate in the non-covalent interactions. Specifically, the polymers from Examples 7-9 were functionalized only with meta-, ortho- and para-versions of nitro-benzaldehyde piperidinehydrazone which, after attachment, includes both donor (>NH) and acceptor (—$NO_2$) groups.

Additional testing data was performed on vulcanizable compounds prepared according to the formulation shown in Table 2, a carbon black-only formulation, where N-phenyl-N'-(1,3-dimethylbutyl)-p-phenyldiamine acts as an antioxidant while benzothiazyl-2-cyclohexylsulfenamide and N,N'-diphenylguanidine act as accelerators.

TABLE 2

| Compound formulation, carbon black only | |
|---|---|
| | Amount (phr) |
| Masterbatch | |
| polymer | 100 |
| carbon black (N343 type) | 55 |
| wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| sulfur | 1.3 |
| benzothiazyl-2-cyclohexylsulfenamide | 1.7 |
| N,N'-diphenylguanidine | 0.2 |
| TOTAL | 174.65 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Dispersion index" were calculated using the equation $$DI=100-\exp[A\times\log_{10}(F^2H)+B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Data corresponding to "Bound rubber" were determined using the procedure described by J. J. Brennan et al., *Rubber Chem. and Tech.*, 40, 817 (1967).

Using the formulation from Table 2 above, vulcanizable elastomeric compounds containing reinforcing fillers were prepared from samples 4-5, 7-9, and 13-14. Results of physical testing on these compounds are shown below in Table 3.

Examples 15-17

Synthesis of cis-1,4-polybutadienes

A catalyst was prepared by mixing 8.08 mL 4.32 M methylaluminoxane in toluene, 1.74 g 1,3-butadiene solution, 0.65 mL 0.537 M neodymium versatate in cyclohexane, 7.33 mL 1.0 M diisobutylaluminum hydride in hexane, and 1.40 mL 1.0 M diethylaluminum chloride in hexane. The catalyst was aged for 15 minutes prior to use.

To a stainless-steel reactor equipped with turbine agitator blades were added 1.54 kg hexane and 2.93 kg 1,3-butadiene solution. Catalyst was introduced into the reactor, and the reactor jacket temperature set to 65° C. About 55 minutes catalyst addition, the polymerization mixture was cooled to room temperature.

A small portion of the resulting polymer cement was transferred to a $N_2$-purged bottle and quenched with 3 mL 10 wt % BHT solution. The resulting mixture was coagulated with 3 L

TABLE 3

| Physical properties, polymers and filled compounds | | | | | | | |
|---|---|---|---|---|---|---|---|
| | 4 | 5 | 7 | 8 | 9 | 13 | 14 |
| $M_n$ (kg/mol) | 114 | 106 | 157 | 161 | 155 | 127 | 167 |
| $M_w/M_n$ | 1.06 | 1.08 | 1.25 | 1.26 | 1.23 | 1.22 | 1.27 |
| % coupling | 0.0 | 0.0 | 59.9 | 57.1 | 39.8 | 32.5 | 64.9 |
| $T_g$ (° C.) | −37.1 | −37.6 | −36.9 | −34.9 | −35.8 | −33.8 | −34.4 |
| Dispersion index | 95.2 | 93.8 | 92.3 | 94.9 | 98.7 | 93.6 | 91.3 |
| Bound rubber | 14.0 | 44.8 | 27.4 | 30.5 | 30.2 | 33.2 | 30.8 |
| $ML_{1+4}$ @ 100° C. | 14.1 | 15.4 | 53.2 | 50.5 | 50.8 | 32.9 | 61.1 |
| 171° C. MDR $t_{50}$ (min) | 2.45 | 2.35 | 2.59 | 2.60 | 2.67 | 2.19 | 2.41 |
| 171° C. MH-ML (kg-cm) | 18.2 | 15.7 | 17.5 | 16.8 | 17.6 | 17.2 | 17.3 |
| $ML_{1+4}$ @ 130° C. | 25.9 | 66.3 | 65.2 | 62.9 | 58.6 | 51.8 | 62.2 |
| 300% modulus @ 23° C. (MPa) | 10.56 | 13.73 | 13.35 | 13.55 | 12.94 | 13.90 | 10.56 |
| Tensile strength @ 23° C. (MPa) | 16.10 | 19.55 | 19.12 | 18.29 | 19.13 | 18.55 | 16.10 |
| Temp. sweep 0° C. tan δ | 0.203 | 0.268 | 0.242 | 0.265 | 0.240 | 0.274 | 0.259 |
| Temp. sweep 50° C. tan δ | 0.251 | 0.102 | 0.149 | 0.176 | 0.202 | 0.183 | 0.196 |
| RDA 0.25-14% ΔG' (MPa) | 4.921 | 0.511 | 1.095 | 0.960 | 1.504 | 1.190 | 1.186 |
| 50° C. RDA strain sweep (5% strain) tan δ | 0.2601 | 0.0978 | 0.1345 | 0.1257 | 0.1527 | 0.1351 | 0.1418 |
| 50° C. Dynastat tan δ | 0.2482 | 0.1000 | 0.1201 | 0.1362 | 0.1518 | 0.1395 | 0.1377 |

The data from Table 3 indicate, inter alia, that filled compositions made from the polymers from Examples 7-9 and 13-14 compared to filled compositions made from a control or comparative polymer (Examples 1-2) have (a) significantly higher—e.g., 200-300%—gum Mooney viscosities ($ML_{1+4}$@ 100° C.) and (b) lower compound Mooney viscosities ($ML_{1+4}$@ 130° C.).

Both of these are desirable for preparing compositions that should be easy to process, specifically, ones that, compared to similar compositions made from a (non-functionalized) control or a (functionalized) comparative interpolymer, are more resistant to flow at $T_1$ but less viscous at $T_2$ where $T_1<T_2$ and $T_2$ is below the temperature at which vulcanizable compositions typically are processed, i.e., ~160° to ~170° C. Thus, they have significantly higher resistance to flow at $T_1$, indicative of resistance to cold flow and easier handling before compounding, but lower resistance to flow at $T_2$, indicative of less better flow (i.e., requiring less energy and/or time) during compounding.

isopropanol containing 0.5 g BHT and then drum-dried. The non-functionalized high-cis PBD, designated Example 15, had a Mooney viscosity ($ML_{1+4}$) of 26.6 as determined by using a Monsanto Mooney viscometer with a large rotor, a one-minute warm-up time, and a four-minute running time.

Another portion (432 g) of the polymer cement was transferred to a $N_2$-purged bottle followed by addition of 3.90 mL DEAB (0.512 M in toluene). The bottle was tumbled for 20 minutes in a 65° C. water bath. The resulting mixture was treated with 3 mL distilled water, coagulated with 3 L isopropanol containing 0.5 g BHT, and then drum-dried. The resulting modified polymer, designated as Example 16, had a Mooney viscosity ($ML_{1+4}$) of 30.0.

Another portion (449 g) of the polymer cement was transferred to a $N_2$-purged bottle followed by addition of 0.44 mL TMDICH (0.467 M in toluene) and 3.65 mL DEAB (0.512 M in toluene). The bottle was tumbled for 20 minutes in a 65° C. water bath. The resulting mixture was treated with 3 mL distilled water, coagulated with 3 L isopropanol containing 0.5 g BHT, and then drum-dried. The resulting modified polymer, designated as Example 17, had a Mooney viscosity ($ML_{1+4}$) of 32.7.

The cold-flow properties of the polymers from Examples 15-17 were measured as described in Example 14. The data are presented below in Table 4.

TABLE 4

| | Stress relaxation at 100% strain (kg · cm) | | | | |
|---|---|---|---|---|---|
| | 5 sec. | 10 sec. | 20 sec. | 70 sec. | 100 sec. |
| Ex. 15 | 0.980 | 0.582 | 0.417 | 0.434 | 0.488 |
| Ex. 16 | 1.202 | 0.739 | 0.474 | 0.472 | 0.534 |
| Ex. 17 | 1.553 | 0.941 | 0.661 | 0.592 | 0.657 |

These data show that a polymer modified with a combination of TMDICH and DEAB (Example 17) gives better cold-flow resistance than either an unmodified polymer (Example 15) or a polymer modified with DEAB alone (Example 16).

That which is claimed is:

1. A composition comprising:
   a) an elastomer comprising polyene mer and a first functional group comprising hydroxyl or amine functionality
   b) an elastomer comprising polyene mer and a second functional group comprising nitro, carboxylate, amide, urea or urethane functionality, and
   c) at least one particulate filler,
each of said first and second functional groups exhibiting interactivity with a particulate filler, wherein a non-covalent interaction between functionalities of said first and second functional groups exhibits a bond energy of from about 0.1 to about 20 kJ/mol and wherein said composition exhibits both an increased gum Mooney viscosity and a decreased compound Mooney viscosity relative to a comparable composition that includes only one of said elastomers.

2. The composition of claim 1 wherein each of said elastomers is substantially linear.

3. The composition of claim 1 further comprising a liquid organic compound in which each of said elastomers is at least partially soluble.

4. The composition of claim 3 wherein at least one of said first and second elastomers further comprises pendent aromatic groups.

5. The composition of claim 4 wherein said aromatic groups are randomly distributed along the elastomer chain.

6. The composition of claim 1 wherein each of said functional groups is at a terminus of the elastomer to which it is bonded.

7. The composition of claim 1 wherein said non-covalent interaction is hydrogen bonding.

8. The composition of claim 1 wherein said second functional group comprises nitro functionality that is part of a nitro-benzaldehyde piperidine hydrazone radical.

9. A composition comprising:
   a) an elastomer comprising polyene mer and a hydroxyl or amine functional group,
   b) an elastomer comprising polyene mer and a nitro functional group, and
   c) a particulate filler
wherein said composition exhibits both an increased Mooney viscosity and a decreased compound Mooney viscosity relative to a comparable composition that includes only one of said elastomers.

10. The composition of claim 9 wherein each of said elastomers is substantially linear.

11. The composition of claim 9 further comprising a liquid organic compound in which each of said elastomers is at least partially soluble.

12. The composition of claim 11 wherein at least one of said elastomers further comprises pendent aromatic groups.

13. The composition of claim 12 wherein said aromatic groups are randomly distributed along the elastomer chain.

14. The composition of claim 9 wherein each of said functional groups is at a terminus of the elastomer to which it is bonded.

15. The composition of claim 14 wherein said nitro group is part of a nitrobenzaldehyde piperidine hydrazone radical.

16. The composition comprising
   a) an elastomer comprising polyene mer and a terminal moiety that comprises both an amine group and a nitro group, and
   b) a particulate filler.

17. The composition of claim 1 wherein at least one of said elastomers comprises only conjugated diene mer.

18. The composition of claim 9 wherein at least one of said elastomers comprises only conjugated diene mer.

19. The composition of claim 16 wherein said elastomer further comprises pendent aromatic groups.

20. The composition of claim 19 wherein said aromatic groups are randomly distributed along the elastomer chain.

* * * * *